(12) United States Patent
Minowa et al.

(10) Patent No.: US 7,161,117 B2
(45) Date of Patent: Jan. 9, 2007

(54) WINDOW GLASS FOR VEHICLES EQUIPPED WITH A CONDUCTOR AND ITS PRODUCTION PROCESS

(75) Inventors: Toshio Minowa, Kanagawa (JP); Hiroyuki Hayakawa, Kanagawa (JP); Shuji Taguchi, Fukushima (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/006,632

(22) Filed: Dec. 8, 2004

(65) Prior Publication Data

US 2005/0153143 A1    Jul. 14, 2005

(30) Foreign Application Priority Data

Dec. 12, 2003   (JP)   ............................. 2003-414987

(51) Int. Cl.
*H05B 3/06* (2006.01)
*C03C 8/14* (2006.01)

(52) U.S. Cl. ................ 219/203; 219/522; 219/543; 219/544; 219/547; 219/548; 501/17; 501/32; 501/73; 501/77; 501/96; 106/1.19

(58) Field of Classification Search ................ 219/203, 219/522, 345, 547–548, 543–544; 106/1.19; 501/17, 32, 73, 77, 96
See application file for complete search history.

(56) References Cited

U.S. PATENT DOCUMENTS

| | | | | |
|---|---|---|---|---|
| 3,414,713 A | * | 12/1968 | Reifeiss et al. | ............. 219/522 |
| 3,484,583 A | * | 12/1969 | Shaw, Jr. | .................... 219/522 |
| 4,044,173 A | | 8/1977 | Laurie | |
| 4,554,258 A | * | 11/1985 | Francel | ......................... 501/21 |
| 4,728,781 A | * | 3/1988 | Donley et al. | .............. 219/547 |
| 4,892,847 A | * | 1/1990 | Reinherz | ..................... 501/14 |
| 4,959,270 A | | 9/1990 | Hasegawa | |
| 5,378,408 A | * | 1/1995 | Carroll et al. | .............. 252/514 |
| 5,468,695 A | * | 11/1995 | Carroll et al. | ................. 501/79 |
| 5,470,506 A | * | 11/1995 | Tanigami et al. | ....... 252/520.22 |

FOREIGN PATENT DOCUMENTS

| | | |
|---|---|---|
| EP | 0 510 542 A1 | 10/1992 |
| EP | 0 987 227 A1 | 3/2000 |
| JP | 7-144933 | 6/1995 |
| JP | 8-34640 | 2/1996 |

OTHER PUBLICATIONS

"Denshi Gijutsu" (Electronics) (extra edition), vol. 25, No. 24, 1983, p. 56-57.

* cited by examiner

*Primary Examiner*—Cathy F. Lam
(74) *Attorney, Agent, or Firm*—Oblon, Spivak, McClelland, Maier & Neustadt, P.C.

(57) ABSTRACT

A window glass for vehicles equipped with a conductor, which comprises a glass plate, a patterned conductor layer formed on the glass plate, and a covering layer formed to cover the conductor layer, wherein the covering layer comprises a fired product obtained by firing a composition containing a crystalline glass powder and a reducing agent capable of reducing silver ions.

12 Claims, 1 Drawing Sheet

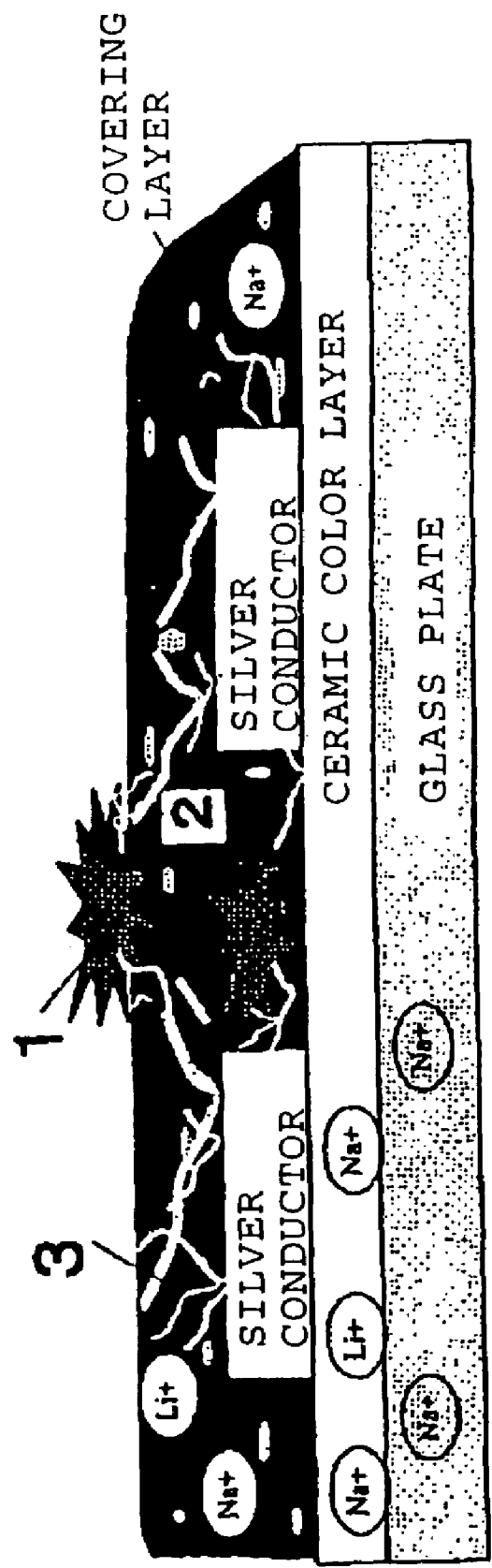
PRIOR ART

WINDOW GLASS FOR VEHICLES EQUIPPED WITH A CONDUCTOR AND ITS PRODUCTION PROCESS

The present invention relates to a window glass for vehicles equipped with a conductor, having a conductor layer such as a glass antenna formed in a glass plate form, to be used for a window glass for automobiles, and its production process.

Heretofore, on a window glass for vehicles particularly for automobiles, a conductor layer is formed for the purpose of forming an antenna, a circuit wiring, a heater, a supply wiring etc. Such a conductor layer is required to have a low resistance, and thus one made of 100% silver is commonly employed.

Such a conductor layer is formed usually in such a manner that a silver paste formed by adding an organic resin binder and a solvent to a silver conductor powder is coated on a flat glass plate, and the glass plate is heated for bending and at the same time the silver paste is fired. Specifically, first, the silver paste is coated in a predetermined pattern on the glass plate, then the glass plate is heated in a molding furnace and softened for bending and at the same time the silver paste is fired, and the glass plate is bent into a desired shape by the glass plate's own weight or the pressure of a pressing component, followed by quenching as the case requires to strengthen the glass plate by heat.

The conductor layer may not be directly formed on the glass plate but is formed on a black ceramic color layer which is usually formed on the peripheral portion of the window glass for automobiles in some cases. In such a case, the black ceramic color paste layer is preliminarily formed on the glass plate, then a conductor paste layer is formed thereon in a predetermined pattern, and the glass plate is heated for bending and at the same time the black ceramic color layer and the silver paste layer are fired.

Attempts to obtain various high added values are being made by forming a conductor pattern on a glass plate. In a case of an antenna also, an antenna having a higher sensitivity is required, and accordingly various patterns become necessary. For example, such a pattern that two antenna wires are formed substantially in parallel with each other and the distance therebetween is at most 5 mm, is desired in some cases.

However, it was found that when such a conductor pattern is formed by silver, silver ions are generated under high temperature and high humidity conditions and migrate on the glass surface, thus causing short-circuiting of two wires in some cases. This phenomenon occurs when the distance is at most about 10 mm, and is remarkable when the distance is at most 5 mm.

It has been known to form on a hybrid substrate comprising a ceramic as a substrate, a glass overcoat layer to cover the circuit. For example, "Denshi Gijutsu" (Electronics) (extra edition) Vol. 25, No. 24, p. 56–57, 1983 discloses such a structure. Such a structure is estimated to be helpful to prevent migration also.

However, it was found that with respect to a silver conductor circuit formed on the window glass for automobiles, migration may not be prevented simply by forming a glass overcoat layer in some cases. Namely, in a window glass for automobiles prepared in such a manner that a silver paste is coated in a predetermined pattern on a glass plate, then a paste to form a covering layer comprising low-melting glass is coated thereon, and the glass plate is heated in a molding furnace and softened for bending and at the same time the silver paste is fired, and the glass plate is bent into a predetermined shape, followed by quenching for strengthening, migration may occur between adjacent two conductor patterns despite the glass covering layer, and a failure such as short-circuiting may occur in some cases.

Under these circumstances, it is an object of the present invention to prevent migration of a conductor particularly silver which occurs on a conductor pattern on the window glass for vehicles, and to improve the degree of freedom in pattern design.

In order to achieve the above object, the present invention provides a window glass for vehicles equipped with a conductor, which comprises a glass plate, a patterned conductor layer formed on the glass plate, and a covering layer formed to cover the conductor layer, wherein the covering layer comprises a fired product obtained by firing a composition containing a crystalline glass powder and a reducing agent capable of reducing silver ions.

The reducing agent is preferably a metal powder or a metal compound powder, and particularly the metal compound powder is preferably a powder of at least one member selected from a metal nitride, a metal boride and a metal carbide. Further, the reducing agent is contained preferably in an amount of from 1 to 30 mass % based on the composition.

Further, as a process to produce such a glass plate equipped with a conductor, the present invention provides a process for producing a window glass for vehicles equipped with a conductor, which comprises a step of forming a patterned conductor paste layer on a glass plate, a step of forming a covering paste layer to cover the conductor paste layer, containing a crystalline glass powder and a reducing agent capable of reducing silver ions, and firing the glass plate having the conductor paste layer and the covering paste layer formed thereon.

In the accompanying drawing:

FIG. 1 is a schematic view illustrating migration.

Now, the present invention will be described in further detail with reference to the preferred embodiments.

According to the present invention, migration of a conductor particularly silver which occurs on a conductor pattern on the window glass for vehicles can be prevented, and the degree of freedom in pattern design can be improved.

The present inventors have conducted extensive studies on the short-circuiting phenomenon by migration of silver which occurs on the window glass for vehicles and as a result, found that such migration of silver is less likely to occur when an amorphous glass which is an usual glass is employed as the glass used as the covering layer of the conductor pattern.

However, it is difficult to use an amorphous glass layer as a covering layer of a conductor pattern on the window glass for automobiles. That is, it is mainly on a side glass or a rear glass that such a conductor pattern is formed, and the window glasses for automobiles at these portions are formed by bending by means of a mold for pressing and by quenching for heat strengthening in many cases. If the covering layer is made of an amorphous glass, the amorphous glass will not be released from the mold at the time of bending, which is likely to be a cause of drawbacks such as optical strain. Accordingly, in a case where a glass layer is formed on the window glass for automobiles, a crystalline glass which is crystallized at a temperature in the vicinity of the bending temperature and is likely to be released from the mold is used in many cases.

The present inventors have found that if a crystalline glass is used as the covering layer, silver migrates to the grain boundaries of the crystals and reaches the surface of the covering layer, and further migrates on the surface of the covering layer, thus causing short-circuiting.

A schematic view illustrating the migration is shown in FIG. 1. FIG. 1 illustrates silver migration in a covering layer formed on a glass plate by means of a ceramic color layer under high temperature, high humidity and DC voltage-applied conditions. Silver migrates from two conductors through the grain boundaries or open pores of the covering layer (3), the large amount of it reaches the surface and causes short-circuiting (1), and part of it causes short-circuiting in the covering layer (2).

Accordingly, the covering layer to be used in the present invention is made of a fired product obtained by firing a composition containing a crystalline glass powder and a reducing agent capable of reducing silver ions, to realize both releasability and migration resistance.

The covering layer may be formed to cover the conductive layer, and it is not necessary to cover the entire glass. A covering layer paste to form this covering layer contains a crystalline glass powder and a reducing agent capable of reducing silver ions as essential components, and contains, as a case requires, a refractory powder or a heat resistant pigment powder as a filler or a coloring agent. This paste is coated on a glass plate, dried and then fired so that it is baked on the glass plate to form the covering layer.

Here, the crystalline glass powder is a component to bake the ceramic color layer on the glass plate and is essential. If the amount of the covering layer paste is less than 60% based on the total amount of inorganic components, the baking may be insufficient. It is preferably at least 65%. If it exceeds 99%, the contents of the other components may be too low.

The glass powder preferably has a softening point Ts of from 500 to 580° C. and an average coefficient of linear expansion α of from $50 \times 10^{-7}$ to $130 \times 10^{-7}$/° C. at from 50 to 350° C. In a case where the paste is baked on a soda lime silica glass plate (typically a softening point of 730° C. and the above coefficient of linear expansion of $87 \times 10^{-7}$/° C.), if Ts is out of the above range, favorable baking may be difficult, and if α is out of the above range, the decrease in strength of the glass plate may be significant.

Further, the glass powder being crystalline means that it has such properties that crystals separate out at a temperature of from 500 to 700° C. which is in the vicinity of the glass bending temperature. Particularly, it is preferred that the glass powder crystallizes when firing by holding the glass plate at the glass bending temperature (for example, about 670° C.) for 4 minutes is carried out. If the glass powder does not crystallize at the time of firing, the releasability tends to decrease. For example, a glass containing lithium, zinc and silicon as its components, from which zinc silicate/lithium type crystals separate out, a glass containing bismuth and silicon as its components, from which crystals of bismuth silicate separate out, or one preliminarily containing seed crystals, from which the seed crystals separate out at the time of firing, may be mentioned. As the crystals which separate out at the time of firing, zinc silicate, boron silicate, lithium silicate, zinc titanate or lithium titanate may, for exmaple, be also mentioned. The crystallization temperature is obtained as the crystallization peak temperature by means of differential thermal analysis.

The mass average particle size of the glass powder is preferably at least 1.2 µm in a case where the releasability is to be more improved. If it is less than 1.2 µm, the surface of the covering layer may be too smooth, whereby the releasability may decrease. Further, it is preferably at most 2.5 µm in view of the stability of the color of the covering layer.

The reducing agent may be one capable of reducing silver ions. By employing this, silver ions which are likely to migrate is reduced to sliver, whereby the migration can be prevented. The reducing agent is preferably a metal powder or a metal compound powder taking the heat resistance into consideration, and particularly, the metal compound is preferably at least one member selected from a metal nitride, a metal boride and a metal carbide. For example, as the metal powder, Ni, Sn, Ti, Mn, Fe, Cu, Ag, La, Zr, Co, Mo, Cr or Ce may be mentioned, and as the metal nitride, metal boride or metal carbide, a nitride, boride or carbide of such a metal may be mentioned.

The amount of the reducing agent is preferably from 1 to 30 mass %, particularly preferably from 1 to 10 mass %, based on the total amount of inorganic components in the covering layer paste. If it is smaller than the above amount, the reducing properties may be insufficient, and if it is larger than the above amount, functions as a glass may be impaired.

The refractory powder is not essential but may be contained as an inorganic component in the covering layer paste to control the coefficient of thermal expansion, to control fluidity, to suppress the decrease in strength of the glass plate and to improve the releasability. If the content of the refractory filler powder exceeds 10 mass %, the glass component tends to be too small, and accordingly baking of the covering layer paste on the glass plate may be difficult at a temperature of bending the glass plate. Such a refractory filler may, for example, be α-alumina, α-quartz, zircon, cordierite, forsterite or bismuth titanate.

Further, as the refractory powder, a heat resistant whisker is preferably contained in order to improve the effect to suppress the decrease in strength of the glass. The heat resistant whisker is an inorganic whisker having a melting point of at least 700° C., a fiber diameter of from 0.1 to 10 µm, a fiber length of from 0.5 to 100 µm and a fiber diameter/fiber length ratio of from 0.001 to 2. Particularly preferred is one having a melting point of at least 1,000° C., a fiber diameter of from 0.5 to 5 µm, a fiber length of from 5 to 50 µm and a fiber diameter/fiber length ratio of from 0.01 to 0.1.

The heat resistant whisker is preferably one made of at least one inorganic material selected from aluminum borate, α-alumina, potassium titanate, zinc oxide, magnesium oxide, magnesium borate, basic magnesium sulfate and titanium diboride, and aluminum borate whisker is particularly preferred.

The content of the heat resistant whisker is preferably from 1 to 10 mass % based on the total amount of inorganic components of the covering layer paste of the present invention. If it is less than 1 mass %, no great improvement in the effect to suppress the decrease in strength of the glass will be obtained. It is more preferably at least 3 mass %. If it exceeds 10 mass %, the fluidity at the time of firing may decrease, whereby open pores form on the covering layer, thus causing deterioration of the migration resistance, or the baking may be insufficient. It is particularly preferably at most 5 mass %.

Further, the heat resistant pigment powder may, for example, be at least one member selected from a group consisting of a copper-chromium-manganese type composite oxide, a chromium-cobalt type composite oxide, an iron-manganese type composite oxide, a chromium-ironnickel type composite oxide, a chromium-copper type composite oxide, magnetite and titania.

If the content of the coloring heat resistant pigment powder is less than 5 mass %, no desired depth may be obtained, for the purpose of fitting the color to a common ceramic color layer, and accordingly it is contained in an amount of preferably at least 5 mass %. On the other hand, if it exceeds 35 mass %, the amount of the glass tends to be too small, whereby baking on the glass plate at the temperature of bending the glass plate may be difficult.

As the crystalline glass powder, one consisting essentially of the following composition may, for example, be preferably mentioned.

Namely, it consists essentially of the following composition:

| | |
|---|---|
| $SiO_2$ | 10 to 25 mass % |
| $Bi_2O_3$ | 60 to 75 mass % |
| $B_2O_3$ | 0 to 15 mass % |
| $Al_2O_3$ | 0 to 8 mass % |
| $Li_2O + Na_2O + K_2O$ | 0 to 4 mass % |
| BaO | 0 to 15 mass % |
| $TiO_2$ | 0 to 3 mass % |
| $CeO_2$ | 0 to 5 mass % |

Such a glass powder is one suitably baked on a glass plate to be used for an ordinary window etc., i.e. a soda lime/silica glass plate having a composition of $SiO_2$: 68 to 74 mass %, $Al_2O_3$: 0.5 to 2 mass %, CaO: 7 to 12 mass %, MgO: 2 to 5 mass % and $Na_2O$: 9 to 15 mass %. That is, part of the crystalline glass powder crystallizes by heating and is baked on the glass plate, and does not adhere to the mold in the press bending step.

The composition of the crystalline glass will be explained below. The following explanation is to explain the composition range of this crystalline glass, and the preferred composition will be different with respect to another crystalline glass.

$SiO_2$ is a glass network former and is a crystallizing component, and is a component to control chemical, thermal and mechanical characteristics. If its content is less than 10 mass %, the glass will be poor in the chemical durability, and if it exceeds 25 mass %, the glass softening point tends to be too high, whereby baking on the glass plate at a temperature of bending the glass plate may be difficult. The content is preferably within a range of from 13 to 22 mass %.

$Bi_2O_3$ is a flux component and is a crystallizing component. If its content is less than 60 mass %, the glass softening point tends to be too high, and if it exceeds 75 mass %, the chemical durability may deteriorate. It is preferably within a range of from 62 to 72 mass %.

$B_2O_3$ is not essential but functions as a flux and can improve melt properties of the glass when contained. However, if its content exceeds 15 mass %, the releasability may deteriorate. Its content is preferably within a range of from 5 to 10 mass %.

$Al_2O_3$ is not essential but may be contained in an amount of at most 8 mass % so as to maintain the strength of the covering layer. Its content is preferably at most 5 mass %.

$Li_2O$, $Na_2O$ and $K_2O$ are not essential, but remarkably improve the melt properties of the glass as a flux component when at least one of them is contained. However, if the total content exceeds 4 mass %, the coefficient of thermal expansion of the composition after sintering tends to be too high, whereby the strength of the glass plate may decrease. Their total content is preferably within a range of from 0.1 to 3 mass %.

BaO is not essential, but remarkably improves the glass softening fluidity when contained. However, if its content exceeds 15 mass %, the releasability and the acid resistance may decrease.

$TiO_2$ is not essential but may optionally be contained within a range not to impair homogeneity of the crystalline glass, for the purpose of adjusting e.g. the sintering temperature, the chemical durability and the coefficient of thermal expansion. However, if its content exceeds 3 mass %, the crystals of bismuth titanate are likely to separate out, whereby the coefficient of thermal expansion tends to be high, and the strength of the glass plate will be significantly impaired.

$CeO_2$ is not essential but may optionally be contained in an amount of at most 5% within a range not to impair homogeneity of the crystalline glass, for the purpose of adjusting e.g. the sintering temperature and the coefficient of thermal expansion.

The crystalline glass may optionally contain, in addition to the above components, a component such as $La_2O_3$, $ZrO_2$, $SnO_2$, MgO, CaO, SrO, ZnO or $P_2O_5$, within a range not to impair homogeneity of the crystalline glass, for the purpose of adjusting e.g. the sintering temperature, the chemical durability and the coefficient of thermal expansion.

The crystalline glass is a crystalline glass from which bismuth silicate separates out in a large amount as the main crystalline phase in a temperature range of from 600 to 700° C. This temperature range corresponds to the temperature range at which the soda lime/silica glass plate as a window glass for vehicles is subjected to bending. Accordingly, when the above ceramic color composition is coated on a desired portion of the glass plate and the glass plate is subjected to bending by heating, part of the crystalline glass crystallizes, the viscosity apparently increases, and the glass will not adhere to the pressing mold.

Of the above respective material powders, the mass average particle size is preferably within a range of from 0.1 to 10 µm. If the mass average particle size is less than 0.1 µm, the productivity is substantially poor, and the material powders may be expensive. On the other hand, if it exceeds 10 µm, the screen printing properties of the paste may be poor. It is preferably from 1 to 6 µm.

In order to form the above inorganic components into a paste to prepare a covering layer paste, an organic vehicle is added. As the organic vehicle, one having a polymer which is commonly used, such as ethyl cellulose, an acrylic resin, a styrene resin, a phenol resin or a butyral resin, dissolved in a solvent such as α-terpineol, butyl carbitol acetate or a phthalate may be used.

As the conductor, one of 100% silver is most preferred in view of low resistance and low cost, however, copper etc. may also be used. The migration characteristics of the copper are not so high as those of silver, however, the effect to prevent migration can be similarly obtained according to the present invention.

The conductor may be formed directly on glass or may be formed via e.g. a ceramic color layer.

The process for producing the window glass for vehicles equipped with a conductor of the present invention is as follows.

First, a metal powder of e.g. silver and a glass powder are mixed with an organic vehicle to prepare a conductor paste, and the above crystalline glass powder and the reducing agent are mixed with an organic vehicle to prepare a covering layer paste. As the organic vehicle, one having a polymer which is commonly used, such as ethyl cellulose, an acrylic resin, a styrene resin, a phenol resin or a butyral resin, dissolved in a solvent such as α-terpineol, butyl carbitol acetate or a phthalate may, for example, be mentioned.

The addition amount of glass frit in the conductor paste is preferably from 5 to 20 mass %. If it is less than 5 mass %, there is a possibility that no sufficient adhesion strength may be obtained, and if it exceeds 20 mass %, adequately low resistance may not be obtained, or soldering wettability may decrease.

Then, the conductor paste and the covering layer paste are coated on a desired portion (determined depending upon the application such as to rear glass or to side glass) of a glass plate for window glass usually made of soda lime silica glass by usual screen printing or the like. The thickness of the conductor paste layer is from 16 to 22 μm for example, and then, drying at a temperature of from 80 to 140° C. for from 1 to 15 minutes for example is carried out. Then, the covering layer paste is further overlaid on the desired pattern of the conductor paste to be in a thickness of from about 38 to about 42 μm for example, and drying at a temperature of from 80 to 140° C. from 1 to 15 minutes for example is carried out for in the same manner as for the silver paste.

The conductor paste and the covering layer paste coated on the glass plate are simultaneously heated to from 500 to 620° C. in a heating oven, so that the conductor and the covering layer of the present invention fuse with the glass plate. Then, the glass is heated at a temperature of from 600 to 700° C. for about 7 minutes for example so that the crystalline glass is crystallized and baked. The glass is subjected to bending by a molding apparatus such as a vacuum absorption forming apparatus or a pressing apparatus provided in the furnace by means of a conventional method. The thickness of the covering layer is preferably at least 15 μm after firing, particularly preferably at least 20 μm. On the other hand, if it exceeds 40 μm, binder removal may be poor, whereby the migration resistance may be deteriorated.

Here, as the case requires, a ceramic color paste may be coated on the glass before the step of coating the conductor paste, and then the above conductor paste and the covering layer paste are coated, followed by firing.

Now, the present invention will be explained in detail with reference to Examples. However, it should be understood that the present invention is by no means restricted to such specific Examples.

Materials were prepared and mixed so that the glass composition (unit: mass %) would be as shown in Table 1, and melted and vitrified at a temperature of from 1,400 to 1,500° C. to obtain a crystalline glass. Then, the crystalline glass was pulverized by a ball mill to obtain a crystalline glass powder having a mass average particle size of about 2.5 μm. Then, the crystalline glass powder, and a heat resistant pigment powder, an aluminum borate powder as a heat resistant whisker, an $Al_2O_3$ powder as a refractory powder, and $ZrB_2$ in Examples 1 and 2 or $TiB_2$ in Example 3 as a reducing agent were mixed in the mass percentage as shown in the section "paste" in Table 1.

As the heat resistant pigment powder, black heat resistant pigment 42-302A ($D_{50}$=0.8 μm) manufactured by Ferro Enamels (Japan) Ltd., which is a copper-chromium-manganese type composite oxide type pigment was used.

As the heat resistant whisker made of aluminum borate, ALBOREX Y (tradename) manufactured by SHIKOKU CORPORATION was used. ALBOREX Y has a composition of $9Al_2O_3 \cdot 2B_2O_3$, and has a fiber diameter of from 0.5 to 5 μm, a fiber length of from 5 to 50 μm and a fiber diameter/fiber length ratio of from 0.01 to 1.

Then, with 80 parts by mass of the mixed powder, 20 parts by mass of an α-terpineol solution having 10 mass % of ethyl cellulose dissolved therein was mixed, followed by kneading, and uniform dispersion was carried out by means of a triple roll mill to adjust the desired paste viscosity, whereby a covering layer paste was obtained. The paste thus obtained was formed in a desired circuit pattern on the entire surface of a soda lime silica glass plate (thickness 3.1 mm, 10 cm square) by screen printing, followed by drying at 120° C. The glass was heated at 650° C. so that the crystalline glass was crystallized, and the silver conductor and the covering layer paste were simultaneously baked.

Evaluation of the releasability of the covering layer was carried out as follows. The glass plate having the above paste solidly coated thereon by screen printing and dried, was put on the bottom of a pressing mold which was put in a heating furnace and the outside of which was covered with a heat resistant glass fiber, held at 670° C. for 4 minutes and pressed to form the glass plate into a glass plate having a curved shape i.e. a curved glass plate. The releasability was evaluated in accordance with the adhesion properties of the curved glass plate equipped with a ceramic color layer to the above pressing mold. Namely, a case where no ceramic color layer adhered to the heat resistant glass fiber and excellent releasability was obtained is represented by ⊚, a case where a ceramic color layer adhered to the heat resistant glass fiber but the curved glass plate could be easily released from the pressing mold by tweezers and favorable releasability was obtained is represented by ○, and a case where a ceramic color layer adhered to the heat resistant glass fiber and the curved glass plate could not easily be released from the pressing mold by tweezers, and the releasability was poor, is represented by X.

Further, the migration of the covering layer was evaluated by means of a migration test of the Ag conductor in the covering layer paste, by forming a desired comb electrode having a conductor width of 0.4 mm, 0.6 mm, 0.8 mm, 1.0 mm or 2.0 mm on the entire surface of a soda lime silica glass plate (thickness 3.1 mm, 10 cm square). The insulation resistance with respect to the conductor width of 1 mm after application of DC15V at 60° C. at 95% was measured. As an insulation resistance tester, Super MegOhm Checker SM-8215 manufactured by DKK-TOA CORPORATION was used.

As the result of the migration evaluation, a case where the insulation resistance was at least $1.0 \times 10^9$ Ωcm after at least 2,000 hours had passed under the above conditions is considered as excellent and is represented by ⊚, a case where the insulation resistance was at least $1.0 \times 10^9$ Ωcm after at least 1,000 hours had passed under conditions other than the above is represented by ○, and a case where the insulation resistance became less than $1.0 \times 10^9$ Ωcm before 1,000 hours had passed is considered as poor and represented by X. The results are shown in Table 1.

As evident from Table 1, the covering layer composition of the present invention is excellent in the releasability and the anti-migration characteristics. In Table 1, Examples 4, 5 and 6 are Comparative Examples.

TABLE 1

| Example | 1 | 2 | 3 | 4 | 5 | 6 |
|---|---|---|---|---|---|---|
| Glass (mass %) | | | | | | |
| Bi$_2$O$_3$ | 65 | | | 57.8 | | |
| PbO | | | | | | 62 |
| SiO$_2$ | 19.2 | | | 30 | | 27 |
| B$_2$O$_3$ | 3.5 | 3.5 | 3.5 | | 3.5 | 3 |
| BaO | 8.2 | | | | | |
| Li$_2$O$_3$ | 1.1 | | | 3.8 | | 0.4 |
| Na$_2$O | | | | | | 0.6 |
| K$_2$O | | | | 1.8 | | |
| Al$_2$O$_3$ | 1.2 | | | | | 2 |
| ZrO$_3$ | | | | | | 2 |
| TiO$_2$ | 1 | | | 6 | | 2 |
| CeO$_2$ | 0.8 | | | 0.6 | | |
| SnO$_2$ | | | | | | 0.5 |
| F | | | | | | 0.5 |
| Total | 100 | | | 100 | | 100 |
| Paste (mass %) | | | | | | |
| Glass | 72 | 70 | 70 | 68 | 70 | 70 |
| Heat resistant pigment | 20 | 22 | 20 | 23 | 21 | 25 |
| Needle filler | 2 | 3 | 2 | | 9 | 9 |
| ZrB$_2$ | 3 | 2 | | | | |
| TiB$_2$ | | | 4 | | | |
| Al$_2$O$_3$ filler | 3 | 3 | 4 | | | 5 |
| Total | 100 | 100 | 100 | 100 | 100 | 100 |
| Fired film characteristics | | | | | | |
| Releasability | ◎ | ◎ | ◎ | ○ | ○ | X |
| Migration | ◎ | ◎ | ◎ | X | X | ◎ |

The present invention is applicable to, for example, a window glass for vehicles such as automobiles.

The entire disclosure of Japanese Patent Application No. 2003-414987 filed on Dec. 12, 2003 including specification, claims, drawings and summary is incorporated herein by reference in its entirety.

What is claimed is:

1. A window glass for vehicles equipped with a conductor, which comprises:
   a glass plate,
   a patterned conductor layer formed on the glass plate, and
   a covering layer formed to cover the conductor layer, said covering layer contacts both the glass plate and the patterned conductor layer formed on the glass plate,
   wherein the covering layer comprises a fired product obtained by firing a composition containing a crystalline glass powder and a reducing agent capable of reducing silver ions,
   wherein the reducing agent is a metal compound powder of at least one member selected from the group consisting of a metal nitride, a metal boride and a metal carbide, and
   wherein the patterned conductor layer formed on the glass plate comprises silver.

2. The window glass for vehicles equipped with a conductor according to claim 1, wherein the reducing agent is contained in an amount of from 1 to 30 mass % based on the composition.

3. The window glass for vehicles equipped with a conductor according to claim 1, wherein the crystalline glass powder consists essentially of:

| | |
|---|---|
| SiO$_2$ | 10 to 25 mass %, |
| Bi$_2$O$_3$ | 60 to 75 mass %, |
| B$_2$O$_3$ | 0 to 15 mass %, |
| Al$_2$O$_3$ | 0 to 8 mass %, |
| Li$_2$O + Na$_2$O + K$_2$O | 0 to 4 mass %, |
| BaO | 0 to 15 mass %, |
| TiO$_2$ | 0 to 3 mass %, and |
| CeO$_2$ | 0 to 5 mass %. |

4. The window glass for vehicles equipped with a conductor according to claim 1, wherein the conductor layer has a slit portion in its pattern, and a width of the slit is at most 5 mm.

5. The window glass for vehicles equipped with a conductor according to claim 1, wherein the reducing agent is contained in an amount of from 1 to 10 mass % based on the composition.

6. A window glass for vehicles equipped with a conductor, which comprises:
   a glass plate and a ceramic color layer formed on the surface of the glass plate,
   a patterned conductor layer formed on the surface of the ceramic color layer, and
   a covering layer formed to cover the conductor layer, said covering layer contacts both the ceramic color layer and the patterned conductor layer formed on the ceramic color layer,
   wherein the covering layer comprises a fired product obtained by firing a composition containing a crystalline glass powder and a reducing agent capable of reducing silver ions,
   wherein the reducing agent is a metal compound powder of at least one member selected from the group consisting of a metal nitride, a metal boride and a metal carbide, and
   wherein the patterned conductor layer formed on the glass plate comprises silver.

7. The window glass for vehicles equipped with a conductor according to claim 6, wherein the reducing agent is contained in an amount of from 1 to 30 mass % based on the composition.

8. The window glass for vehicles equipped with a conductor according to claim 6, wherein the crystalline glass powder consists essentially of:

| | |
|---|---|
| SiO$_2$ | 10 to 25 mass %, |
| Bi$_2$O$_3$ | 60 to 75 mass %, |
| B$_2$O$_3$ | 0 to 15 mass %, |
| Al$_2$O$_3$ | 0 to 8 mass %, |
| Li$_2$O + Na$_2$O + K$_2$O | 0 to 4 mass %, |
| BaO | 0 to 15 mass %, |
| TiO$_2$ | 0 to 3 mass %, and |
| CeO$_2$ | 0 to 5 mass %. |

9. The window glass for vehicles equipped with a conductor according to claim 6, wherein the conductor layer has a slit portion in its pattern, and a width of the slit is at most 5 mm.

10. The window glass for vehicles equipped with a conductor according to claim 6, wherein the reducing agent is contained in an amount of from 1 to 10 mass % based on the composition.

11. A window glass for vehicles equipped with a conductor, which comprises:

a glass plate, a patterned conductor layer formed on the glass plate, and a covering layer formed to cover the conductor layer, said covering layer contacts both the glass plate and the patterned conductor layer formed on the glass plate, wherein the covering layer comprises a fired product obtained by firing a composition containing a crystalline glass powder and a reducing agent capable of reducing silver ions, wherein the reducing agent is contained in an amount of from 1 to 30 mass % based on the composition, and wherein the patterned conductor layer formed on the glass plate comprises silver.

12. A window glass for vehicles equipped with a conductor, which comprises:

a glass plate and a ceramic color layer formed on the surface of the glass plate, a patterned conductor layer formed on the surface of the ceramic color layer, and a covering layer formed to cover the conductor layer, said covering layer contacts both the ceramic color layer and the patterned conductor layer formed on the ceramic color layer, wherein the covering layer comprises a fired product obtained by firing a composition containing a crystalline glass powder and a reducing agent capable of reducing silver ions, wherein the reducing agent is contained in an amount of from 1 to 30 mass % based on the composition, and wherein the patterned conductor layer formed on the glass plate comprises silver.

* * * * *